United States Patent
Jiao et al.

(10) Patent No.: US 9,690,024 B2
(45) Date of Patent: *Jun. 27, 2017

(54) DISPLAYS WITH POLARIZER LAYERS FOR ELECTRONIC DEVICES

(71) Applicant: Apple Inc., Cupertino, CA (US)

(72) Inventors: Meizi Jiao, Cupertino, CA (US); Jun Qi, Cupertino, CA (US); Victor H. Yin, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/790,822

(22) Filed: Jul. 2, 2015

(65) Prior Publication Data
US 2015/0378078 A1    Dec. 31, 2015

Related U.S. Application Data

(63) Continuation of application No. 13/664,413, filed on Oct. 30, 2012, now Pat. No. 9,075,199.

(51) Int. Cl.
*G02B 5/30* (2006.01)
*G02F 1/1335* (2006.01)
*G06F 3/041* (2006.01)
*G02B 5/00* (2006.01)
(Continued)

(52) U.S. Cl.
CPC .......... *G02B 5/3041* (2013.01); *G02B 5/005* (2013.01); *G02B 5/30* (2013.01); *G02B 5/3033* (2013.01); *G02F 1/133528* (2013.01); *G06F 3/041* (2013.01); *G02B 5/3083* (2013.01); *G02F 2001/13312* (2013.01);
(Continued)

(58) Field of Classification Search
CPC ........ G02B 5/3041; G02B 5/005; G02B 5/30; G02B 5/3033; G02B 5/3083; G02F 1/133528; G06F 3/041
USPC ..... 359/483.01, 491.01; 361/679.21, 679.23; 396/429; 349/58, 62
See application file for complete search history.

(56) References Cited

U.S. PATENT DOCUMENTS

| 6,864,435 B2 | 3/2005 | Hermanns et al. |
| 8,467,177 B2 | 6/2013 | Mathew et al. |
| 2006/0028601 A1 | 2/2006 | Kawahara et al. |

(Continued)

FOREIGN PATENT DOCUMENTS

WO    2011052901    5/2011

*Primary Examiner* — Frank Font
(74) *Attorney, Agent, or Firm* — Treyz Law Group, P.C.; Zachary D. Hadd

(57) ABSTRACT

An electronic device may have a display. Inactive portions of the display may be masked using an opaque masking layer. An opening may be provided in the masking layer. A camera may receive light through the opening in the opaque masking layer. The display may include upper and lower polarizers, a color filter layer, and a thin-film transistor layer. The upper polarizer may have an unpolarized window aligned with the opening in the opaque masking layer for the camera, a logo, or another internal structure. The unpolarized window may be formed from openings in polarizer layers such as a polyvinyl alcohol layer and optical retarder layers. The openings may pass through all or less than all of the polarizer layers. The openings may be filled with transparent filler material. The polarizer may include a try-acetyl cellulose layer that continuously covers the opening in other polarizer layers.

20 Claims, 18 Drawing Sheets

(51) Int. Cl.
*G02F 1/133* (2006.01)
*G02F 1/1333* (2006.01)

(52) U.S. Cl.
CPC ............ *G02F 2001/133388* (2013.01); *G06F 2203/04103* (2013.01); *Y10T 156/1056* (2015.01)

(56) References Cited

U.S. PATENT DOCUMENTS

| | | |
|---|---|---|
| 2010/0108119 A1 | 5/2010 | Gee et al. |
| 2010/0315570 A1 | 12/2010 | Mathew et al. |
| 2011/0109829 A1* | 5/2011 | Mathew ............ G02F 1/133514 349/58 |
| 2012/0020000 A1* | 1/2012 | Mathew ................ G06F 1/1637 361/679.26 |
| 2012/0105400 A1 | 5/2012 | Mathew et al. |

* cited by examiner

DISPLAYS WITH POLARIZER LAYERS FOR ELECTRONIC DEVICES

This application is a continuation of U.S. patent application Ser. No. 13/664,413, filed Oct. 30, 2012, which is hereby incorporated by reference herein in its entirety. This application claims the benefit of and claims priority to U.S. patent application Ser. No. 13/664,413, filed Oct. 30, 2012.

BACKGROUND

This invention relates to electronic devices and, more particularly, to display structures for electronic devices such as portable computers.

Electronic devices such as portable computers and cellular telephones typically have displays. To provide protection from damage, many displays are provided with cover glass layers. The cover glass layer helps protect underlying display structures from scratches and other damage during use of the electronic device. A patterned layer of black ink is sometimes formed on the underside of the cover glass layer to form an opaque border region. The opaque border region can hide internal device components from view. An opening in the black ink can be provided for a camera that is mounted behind the cover glass.

As device manufacturers strive to reduce device size and weight, it is becoming unacceptable to include potentially bulky and heavy display structures in a display. It may therefore be desirable to omit the cover glass layer from a display. Care must be taken, however, to ensure that unsightly internal components remain hidden from view and that internal components such as cameras are still able to function properly.

It would therefore be desirable to be able to provide improved display structures in electronic devices such as portable computers and cellular telephones.

SUMMARY

An electronic device such as a portable computer, cellular telephone, or other electronic equipment may have a display. The display may have an active portion such as a central rectangular region in which images are presented to a user of the device. Inactive portions of the display such as peripheral portions of the display may be masked using an opaque masking layer. The opaque masking layer may be formed from colored ink.

An opening may be provided in the opaque masking layer to allow light to pass. For example, a logo or other information may be viewed through an opening in the opaque masking layer. Cameras and other internal electronic components may receive light through an opening in the opaque masking layer.

The display may include upper and lower polarizers, a color filter layer, and a thin-film transistor layer. The opaque masking layer may be formed on the upper polarizer, may be interposed between the upper polarizer and the color filter layer, or may be interposed between the color filter layer and the thin-film transistor layer.

The upper polarizer may have unpolarized windows. The upper polarizer may be formed from polarizer layers such as a layer of stretched polyvinyl alcohol, a layer of tri-acetyl cellulose, one or more optical retarder layers and one or more layers of adhesive such as optically clear adhesive. An unpolarized window in the upper polarizer may be formed from a region of the upper polarizer in which the polyvinyl alcohol layer has been removed. In this way, light that passes through an opening in the polyvinyl alcohol layer in the unpolarized window portion of the upper polarizer may pass through the upper polarizer without being attenuated by the polarizing effects of the upper polarizer. Polarizer layers may be removed by drilling using, for example, laser drilling equipment.

The unpolarized window may include optically transparent material such as an optically clear adhesive, a transparent polymer or glass that fills the region in which the polyvinyl alcohol layer has been removed. The upper polarizer may include openings in other polarizer layers. The optically transparent material may be formed in the openings in the other polarizer layers. In some configurations, the tri-acetyl cellulose layer may extend across the unpolarized window over the opening in the polyvinyl alcohol layer. In other configurations, the transparent material may fill an opening in the tri-acetyl cellulose layer and may cover the tri-acetyl cellulose layer.

A camera may be aligned with the unpolarized window in the polarizer and the opening in the opaque masking layer to receive image light. A logo may be aligned with the unpolarized window in the polarizer layer and the opening in the opaque masking layer so that the logo is visible from the exterior of the device. Other internal components of the electronic device such as sensors and status indicators may also be mounted beneath unpolarized windows in the polarizer and openings in the opaque masking layer.

Further features of the invention, its nature and various advantages will be more apparent from the accompanying drawings and the following detailed description of the preferred embodiments.

DETAILED DESCRIPTION

Electronic devices such as notebook computers, tablet computers, cellular telephones, and other computing equipment may be provided with displays.

Figure 1:
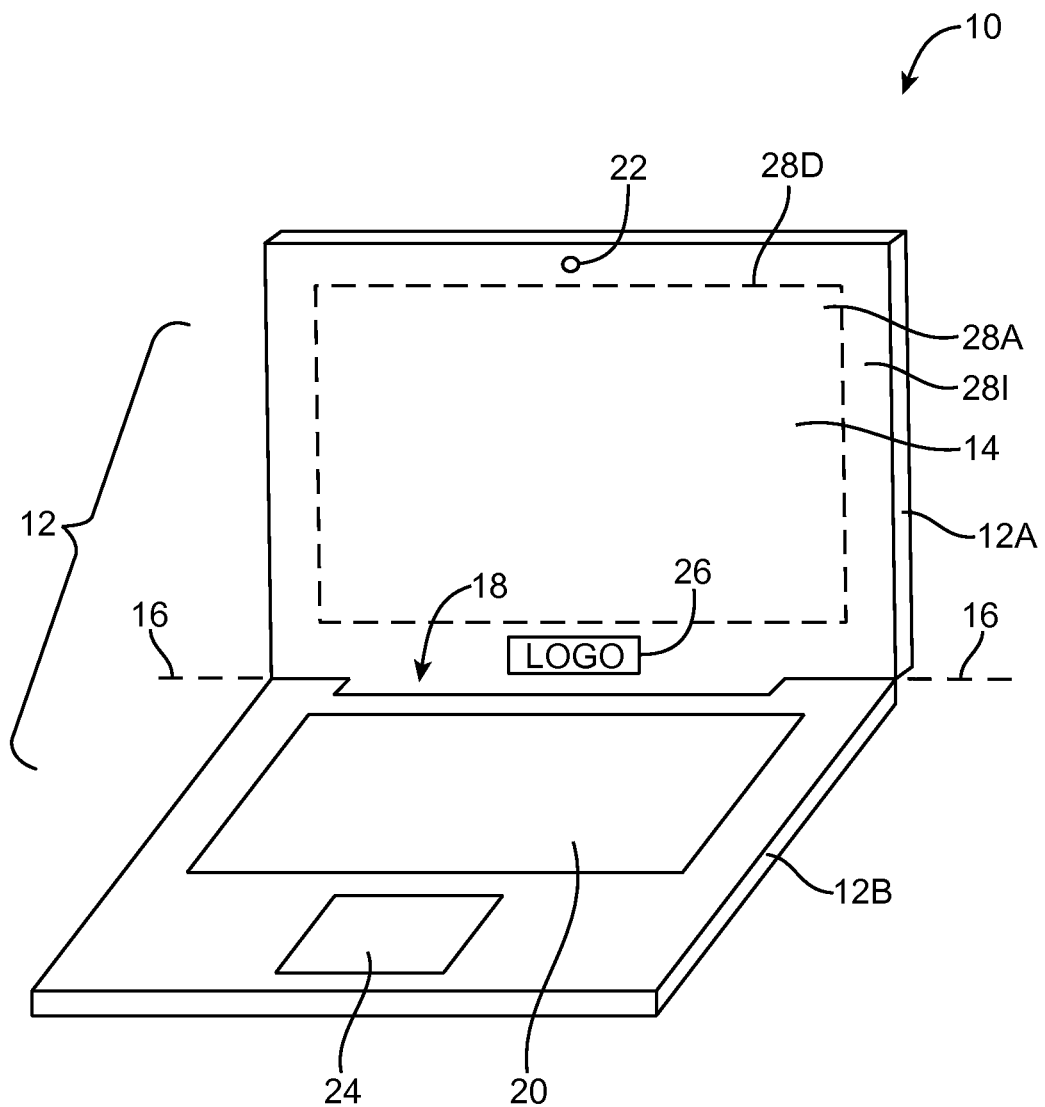
FIG. 1 is a perspective view of an illustrative portable computer with display structures in accordance with an embodiment of the present invention.

An illustrative electronic device such as a portable computer or other electronic equipment that has a display is shown in FIG. 1. As shown in FIG. 1, display 14 of device 10 may be mounted in upper housing portion 12A of housing 12. Housing 12 may be formed from a unibody construction in which some or all of housing 12 is formed form a unitary piece of material (e.g., metal, plastic, or fiber composite materials) or may be formed from multiple structures that have been mounted together using adhesive, fasteners, and other attachment mechanisms. For example, housing 12 may be formed from frame members and other internal supports to which external plates, housing sidewalls, bezel structures, and other structures are mounted.

Because housing portion 12A may be used to house display 14, housing portion 12A may sometimes be referred to as a display housing. Display housing 12A may be attached to housing portion 12B (sometimes referred to as a main unit or base housing) using hinge structures 18, so that display housing 12A may rotate relative to main housing 12B around hinge axis 16. Device 10 may include ports for removable media, data ports, keys such as keyboard 20, input devices such as track pad 24, microphones, speakers, sensors, status indicators lights, etc.

Display 14 may have an active portion and an inactive portion. Active portion 28A of display 14 may have a shape such as the rectangular shape that is bounded by dashed line 28D in FIG. 1. Inactive portion 28I of display 14 may have a rectangular ring shape or other suitable shape and may form a border around the periphery of display 14. Image pixel array elements such as liquid crystal diode image pixels or other active image pixel structures may be used in portion 28A to present images to a user of device 10. Inactive portion 28I is generally devoid of image pixel elements and does not participate in forming images for a user. To hide unsightly internal components from view, internal components in inactive portion 28I may be blocked from view using an opaque masking layer such as a layer of ink.

Device 10 may have components that are formed in inactive device region 28I. For example, device 10 may have a camera such as camera 22. Camera 22 may be mounted within display housing 12A and may operate through a window (sometimes referred to as a camera window) in display 14.

Information structures 26 such as a logo may be mounted on device 10. Information structures 26 may be a trademarked logo that represents a manufacturer of device 10, may be printed text, may be trademarked text, may be a design, may be personalized information (e.g., information identifying an owner of device 10), may be formed from a combination of text and non-text information, or may include other suitable content. Information structures 26 may be formed from patterned ink, patterned paint, patterned polymer, patterned metal traces, or other suitable materials.

Information structures 26 may be mounted in upper housing 12A. For example, information structures 26 or may be formed in inactive display region 28I of upper housing 12A under a transparent window in display 14.

Figure 2:
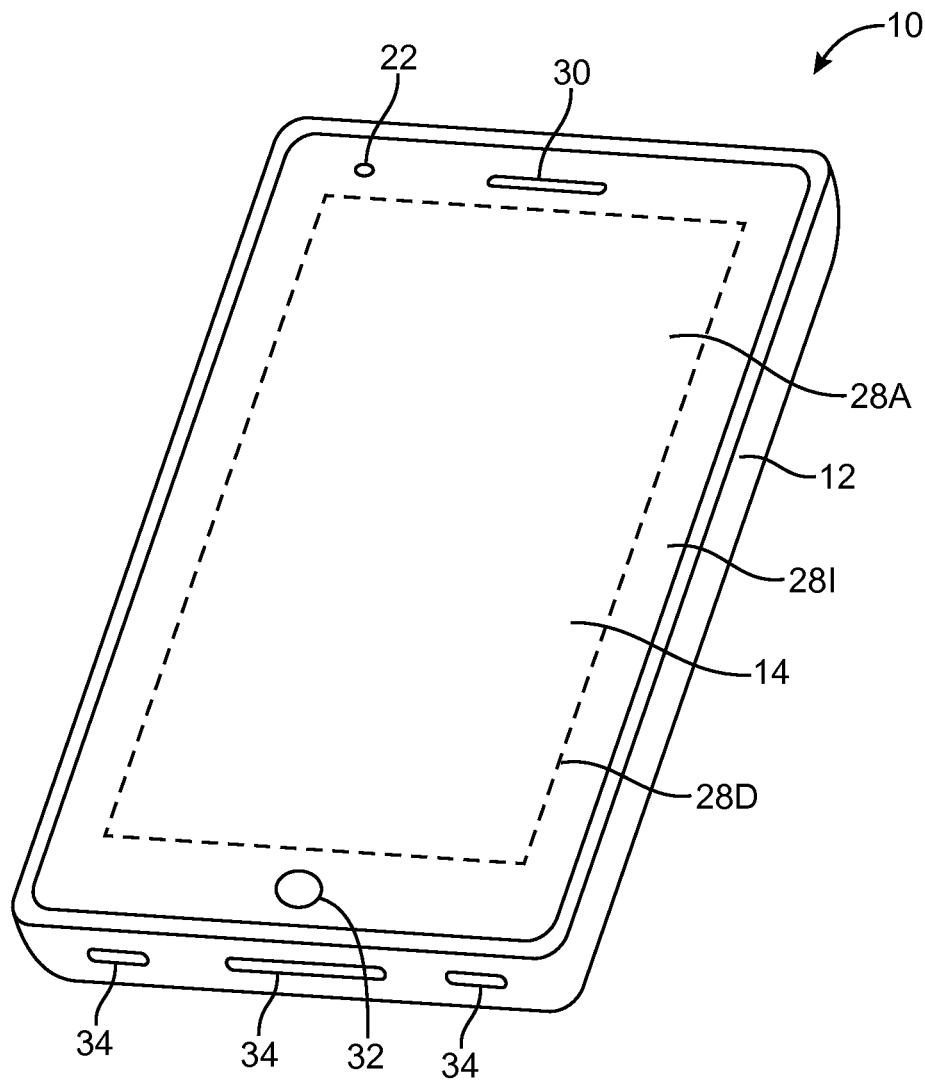
FIG. 2 is a perspective view of a handheld electronic device with display structures in accordance with an embodiment of the present invention.

FIG. 2 is a perspective view of an illustrative configuration that may be used for a handheld electronic device. Electronic device 10 of FIG. 2 may be, for example, a cellular telephone or other handheld electronic equipment. Device 10 of FIG. 1 may have housing 12. Display 14 may be mounted within housing 12 on the front of device 10. Active portion 28A of display 14 may lie within rectangular boundary 28D. Inactive portion 28I of display 14 may form a boundary around the periphery of display 14. Housing 12 may have sidewalls that run around the periphery of device 10 (as an example). The sidewall structures of housing 12 may be formed from metal, plastic, glass, ceramic, carbon-fiber materials or other fiber-based composites, other materials, or combinations of these materials. The rear of housing 12 may be formed from metal, plastic, a planar member such as a glass or ceramic plate, fiber-based composites, other materials, or combinations of these materials.

Device 10 may have openings such as openings 34 in the sidewalls of housing 12. Openings 34 may be used to form microphone and speaker ports, openings to accommodate button members, openings for data ports and audio jacks, etc. One or more openings may be formed in inactive region 28I of display 14. For example, one or more openings may be formed in inactive region 28I for buttons such as button 32 (e.g., a menu button). Openings such as opening 30 may also be formed in inactive region 28I (e.g., to form a speaker port for an ear speaker).

Camera 22 may be formed behind a window in device 10 such as a camera window in inactive region 28I (as an example). If desired, windows may also be formed over information such as logo information (see, e.g., information structures 26 of FIG. 1) to allow the logo or other information to be viewed by a user of device 10. Windows for camera 22 and/or logo 26 may be formed from openings in an opaque masking layer that are aligned with unpolarized windows in a display polarizer. Display 14 may have a smooth outer surface that passes continuously over the windows for camera 22 and/or logo 26.

The illustrative electronic device structures of FIGS. 1 and 2 are merely examples. Any suitable electronic devices 10 may be provided with displays 14. Electronic devices 10 may, for example, include tablet computers, wristwatch devices, pendant devices, other miniature and wearable devices, televisions, computer displays, accessories, etc.

Figure 3:
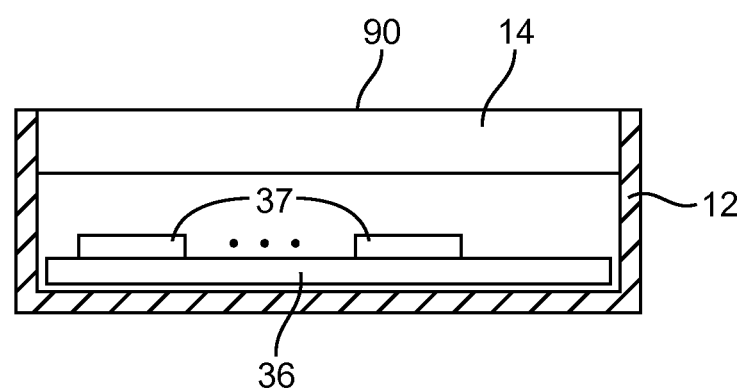
FIG. 3 is a cross-sectional side view of an electronic device having a display in accordance with an embodiment of the present invention.

A cross-sectional end view of an electronic device with a display (e.g., a device such as device 10 of FIG. 2, a portion of device 10 of FIG. 1, etc.) is shown in FIG. 3. As shown in FIG. 3, display 14 may be mounted within housing 12 so that exterior surface 90 of display 14 is exposed. Device housing 12 may be used to enclose printed circuit boards such as printed circuit board 36. Printed circuit board 36 may be a rigid printed circuit board such as a fiberglass-filled epoxy printed circuit board (e.g., FR4), a flexible printed circuit ("flex circuit") formed from a flexible dielectric such as a sheet of polyimide with patterned conductive traces, a rigid flex substrate, or other substrate.

Electrical components such as components 37 may be mounted to boards such as board 36. Electrical components 37 may include switches, resistors, inductors, capacitors, integrated circuits, connectors, cameras, sensors, speakers, or other device components. These components may be soldered or otherwise connected to board 36.

Display 14 may be a touch screen display. Touch screen displays such as display 14 of FIG. 3 may include an array of capacitive electrodes (e.g., transparent electrodes such as indium tin oxide electrodes), or may include a touch sensor array based on other touch technologies (e.g., resistive touch sensor structures, acoustic touch sensor structures, piezoelectric sensors and other force sensor structures, etc.) The touch structures for display 14 may be implemented on a dedicated touch sensor substrate such as a layer of glass or may be formed on the same layer of glass that is being used for other display functions. For example, touch sensor electrodes may be formed on a color filter array layer, a thin-film transistor layer, or other layers in a liquid crystal display (LCD).

Display 14 may, in general, be formed from any suitable type of display structures. Examples of display structures that may be used for display 14 include liquid crystal display (LCD) structures, organic light-emitting diode (OLED) structures, plasma cells, and electronic ink display structures. Arrangements in which display 14 is formed from liquid crystal display (LCD) structures are sometimes described herein as an example. This is merely illustrative. In general, display 14 may be formed using any suitable display technology.

Figure 4:
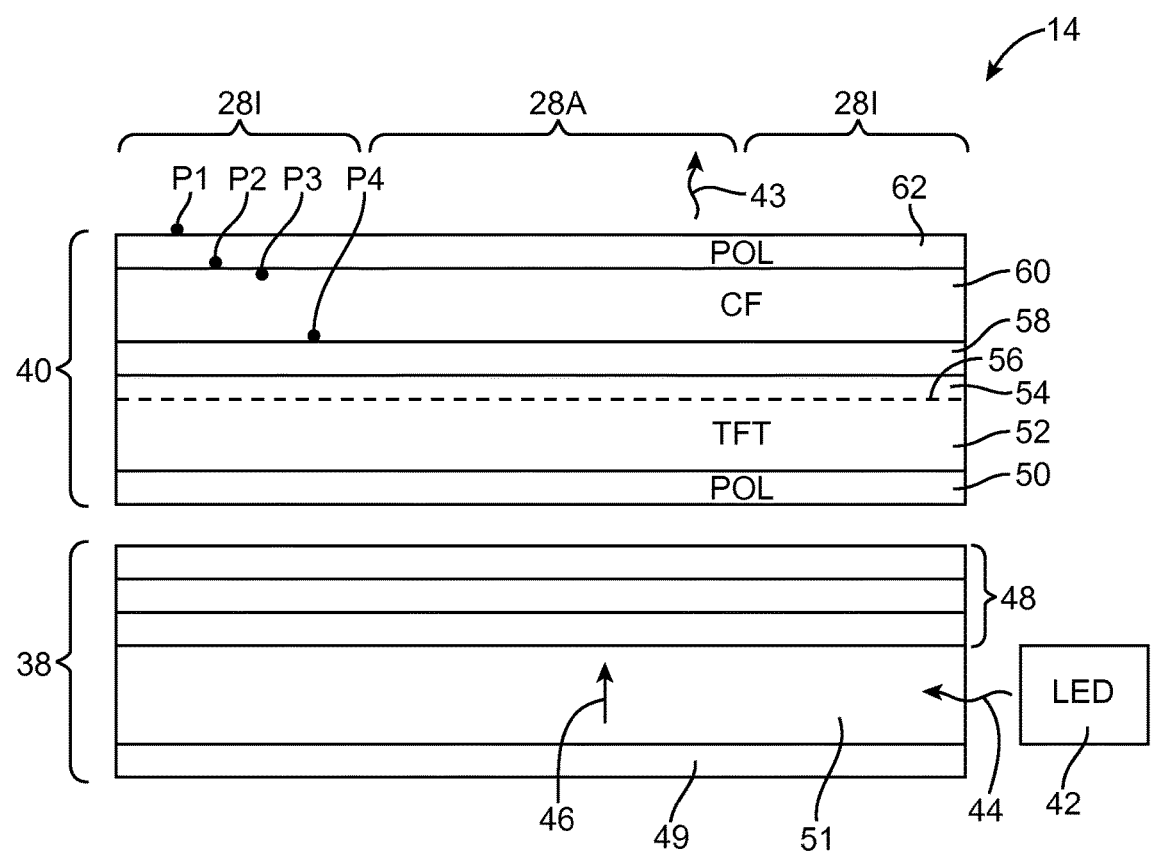
FIG. 4 is a cross-sectional side view of illustrative display structures in accordance with an embodiment of the present invention.

A cross-sectional view of display 14 of FIGS. 1, 2 and 3 is shown in FIG. 4. As shown in FIG. 4, display 14 may include a backlight unit (BLU) such as backlight unit 38. Light 44 for backlight unit 38 may be launched into light-guide panel 51 from light source 42. Light source 42 may be formed from an array of light-emitting diodes (as an example). Reflector 49 (e.g., white polyester) may be used to reflect light 44 upwards (outwards) in direction 46 through display module 40. Optical films 48 may include a diffuser layer and light collimating layers (as an example).

Display 14 and display module 40 may have an active region 28A that produces image pixel light 43 from an array of image pixels. Image pixel light 43 forms an image in active region 28A that may be viewed by a user of device 10. The image may include text, graphics, or other image information. A portion of display 14 and display module 40 such as region 28I may be inactive. Region 28I may have a shape that surrounds the periphery of display 14 and display module 40 as shown in FIG. 1 (as an example). Inactive region 28I generally does not contain active image pixels and may include an opaque masking layer to block interior structures from view. Backlight unit 38 may have a footprint that is aligned with active region 28A or may have edges that extend under some or all of inactive region 28I (as shown in FIG. 4).

Display module 40 may include a lower polarizer such as lower polarizer 50 and an upper polarizer such as polarizer 62. A thin layer (e.g., 3-5 microns) of liquid crystal material 58 may be interposed between color filter layer 60 and thin-film transistor layer 52.

Thin-film transistor layer 52 may be formed on a transparent planar substrate such as a layer of glass or plastic. The upper surface of thin-film-transistor layer 52 may contain pixel electrode structures and thin-film transistors (shown as circuitry 54 above dashed line 56). The circuitry on thin-film-transistor layer 52 may be organized into an array of image pixels that can be controlled to display images on display 14 for a user of device 10.

Color filter layer 60 may include colored filter pixel elements (e.g., red, green, and blue filter elements) that provide display 14 with the ability to display color images. Color filter layer 60 may be formed using a transparent planar substrate such as a glass or plastic substrate.

If desired, other layers of material may be included within display module 40 and backlight unit 38. For example, display module 40 and backlight unit 38 may include one or more layers of material for forming a touch sensor, layers of optical films such as birefringent compensating films, anti-reflection coatings, scratch prevention coatings, oleophobic coatings, layers of adhesive, etc.

Figure 5:
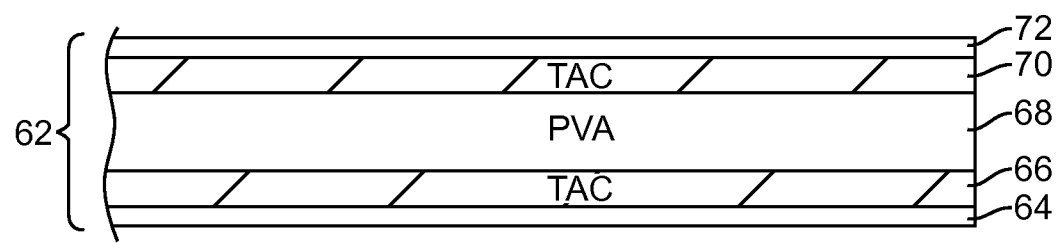
FIG. 5 is a cross-sectional side view of an illustrative polarizer having polarizer layers that include multiple tri-acetyl cellulose layers for an electronic device display in accordance with an embodiment of the present invention.

Polarizers such as upper (outer) polarizer 62 and lower (inner) polarizer 50 may be formed from multiple layers of material that are laminated together. An illustrative laminated polarizer is shown in the cross-sectional side view of FIG. 5. As shown in FIG. 5, polarizer 62 (i.e., an upper polarizer in this example) may have polarizer film 68. Film 68 may be formed from a stretched polymer such as stretched polyvinyl alcohol (PVA) and may therefore sometimes be referred to as a PVA layer. Iodine may be placed on to the stretched PVA film so that iodine molecules align with the stretched film and form the polarizing layer of polarizer 62. Other polarizer films may be used if desired. Polarizer film 68 may be sandwiched between layers 66 and 70. Layers 66 and 70 may be formed from a material such as tri-acetyl cellulose (TAC) and may sometimes be referred to as TAC films or TAC layers. The TAC films may help hold the PVA film in its stretched configuration and may protect the PVA film. Other films such as optical retarder films may be laminated to film 68 if desired.

Coating layer 72 may be formed from one or more films of material that provide polarizer 62 with desired surface properties. For example, layer 72 may be formed from optical enhancement materials that provide polarizer 62 with antiglare (light diffusing) properties or antireflection properties or protective properties such as scratch resistance, fingerprint resistance, and other desired properties.

Layer 72 may be formed from one or more layers of material such as antireflection (AR) layers (e.g., films formed from a stack of alternating high-index-of-refraction and low-index-of-refraction layers), antiglare (AG) layers, antireflection-antiglare (AR/AG) layers, oleophobic layers, antiscratch coatings, or other coating layers. The functions of these layers need not be mutually exclusive. For example, an antiglare film in coating 72 may help provide polarizer 62 with scratch resistance.

Polarizer 62 may, if desired, be provided with a layer of adhesive such as adhesive 64 (e.g., optically clear adhesive) to help attach polarizer 62 to the upper surface of display module 40 (i.e., color filter 60 of FIG. 4). However, the example of FIG. 5 in which polarizer 62 includes multiple layers of tri-acetyl cellulose and a single layer of adhesive 64 is merely illustrative. If desired, polarizer 62 may include a single layer of tri-acetyl cellulose attached to the polyvinyl alcohol layer and one or more optical retarder (OR) layers as shown in FIG. 6.

Figure 6:
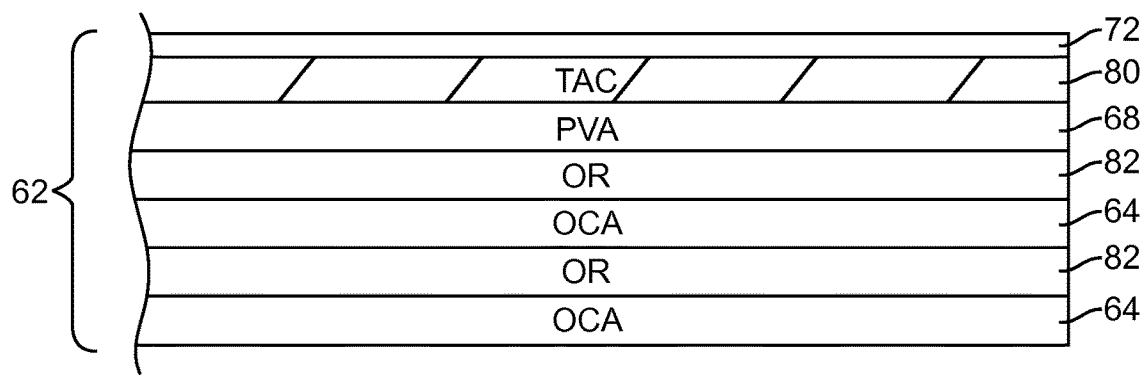
FIG. 6 is a cross-sectional side view of an illustrative polarizer having polarizer layers that include a tri-acetyl cellulose layer and multiple optical retarder layers for an electronic device display in accordance with an embodiment of the present invention.

In the example of FIG. 6, a layer of optically retarding material such as an optical retarder film 82 is laminated to a surface of the polyvinyl alcohol layer and tri-acetyl cellulose layer 80 is laminated to an opposing surface of the polyvinyl acetate layer. Polarizer 62 may also include a layer of optically clear adhesive 64 (e.g., an optically clear pressure sensitive adhesive or other optically clear adhesive) on the optical retarder layer 82 that is attached to polyvinyl alcohol layer 68. The optically clear adhesive 64 on the optical retarder layer 82 that is attached to polyvinyl alcohol layer 68 may attach another layer 82 of optically retarding material to polarizer 62. Polarizer 62 may be provided with an additional layer of optically clear adhesive 64 that helps attach polarizer 62 to the upper surface of display module 40 (i.e., color filter 60 of FIG. 4). The thickness of polarizer 62 may be about 50-200 microns (as an example).

Figure 7:
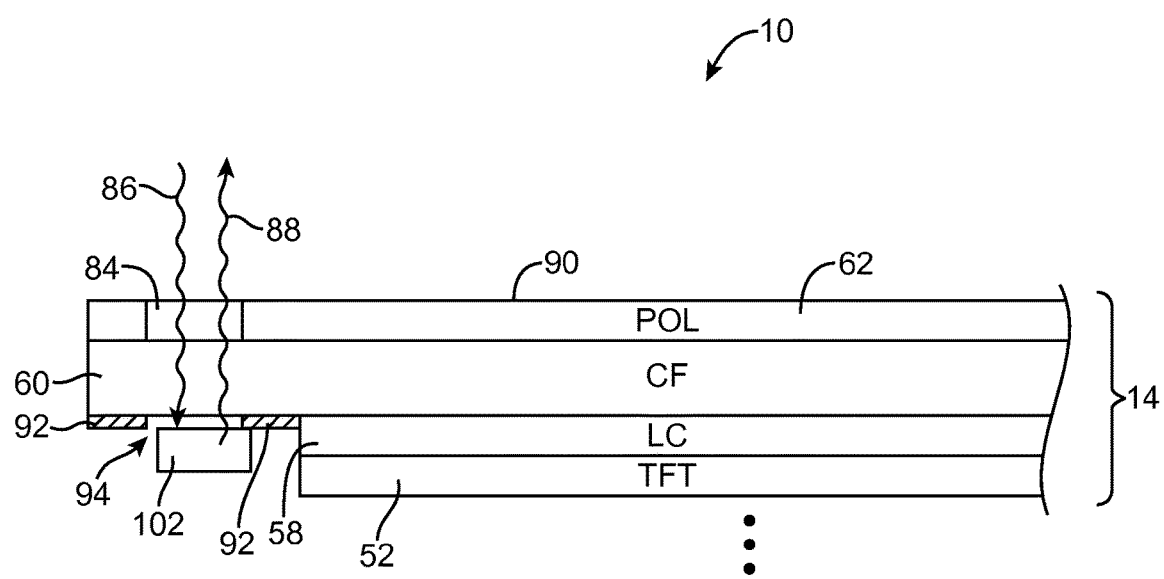
FIG. 7 is a cross-sectional side view of an illustrative display having an upper polarizer with an unpolarized window that exposes internal device structures in accordance with an embodiment of the present invention.

It is often desirable to mount electronic components such as cameras and other structures within the interior of an electronic device that interact with light that is transmitted into or out of the device. If desired, a camera or other internal device structure that interacts with light that is transmitted into or out of the device may be mounted under a portion of the display module. As shown in FIG. 7, for example, internal structure 102 may be mounted below an edge portion of color filter layer 60 and polarizer 62 (as an example). Internal structure 102 may be a camera (e.g., a camera such as camera 22 of FIGS. 1 and 2 that receives light 86 through layer 60 and polarizer 62), a sensor that receives light through layer 60 and polarizer 62, patterned information structures in the shape of a logo or other information such as structures 26 of FIG. 1, a status indicator (e.g. a status indicator element that emits light through layer 60 and polarizer 62), or other suitable internal structures in device 10.

Polarizer 62 may include an unpolarized window 84. Portions of polarizer 62 other than unpolarized window 84 may attenuate the amount of unpolarized light 86 that enters device 10 or the amount of unpolarized light 88 that exits device 10 by blocking a portion of the unpolarized light. Unpolarized window 84 may be portion of polarizer 62 that allows light of substantially all polarizations to pass through window 84.

Unpolarized window 84 may be a portion of polarizer 62 that includes an opening in a polyvinyl alcohol layer of the polarizer. Unpolarized window 84 may have a thickness that is substantially the same as the thickness of other portions of polarizer 62. Outer surface 90 of polarizer 62 may form an outer surface of device 10. Outer surface 90 may be a smooth outer surface without any surface features (e.g., openings or protrusions) in the vicinity of unpolarized window 84. Unpolarized window 84 may have an outer surface portion that is formed in a plane with other portions of outer surface 90. Unpolarized window 84 may include a continuous layer of tri-acetyl cellulose over the opening in the polyvinyl alcohol layer so that the outer surface of polarizer 62 is a continuous outer surface without any openings. However, this is merely illustrative. If desired, unpolarized window 84 may include an opening in both the polyvinyl alcohol layer and the tri-acetyl cellulose layer and a protective transparent material that covers that tri-acetyl cellulose layer and fills the opening in the polyvinyl alcohol layer and the TAC layer.

Unpolarized window 84 may be formed from openings that have circular shapes (e.g., for forming a circular opening that is aligned with a camera lens), rectangular shapes (e.g., for exposing a logo or other information that has a rectangular outline), or other suitable shapes.

To ensure that potentially unsightly internal portions of device 10 are blocked from view, device 10 may be provided with one more layers of opaque masking material 92. For example, opaque masking layer 92 may be incorporated onto one or more of the layers of material in display module 40 of FIG. 4. The opaque masking layer may be formed from black ink, ink with other (non-black) colors (e.g., white, silver, gray, red, blue), an opaque polymer, a layer of metal, or other suitable opaque substances.

Examples of locations in which the opaque masking layer may be formed in module 40 (see FIG. 4) include position P1 on the top of polarizer 62, position P2 on the lower surface of polarizer 62, position P3 on the top surface of color filter layer 60, and position P4 on the lower surface of color filter layer 60. Other masking layer locations and combinations of masking layer locations may be used if desired. Opaque masking layer 92 may include an opening such as opening 94 that is aligned with unpolarized window 84 of polarizer 62 so that incoming light 86 and/or outgoing light 88 can pass through unpolarized window 84 and opening 94 to and/or from structure 102.

Figure 8:
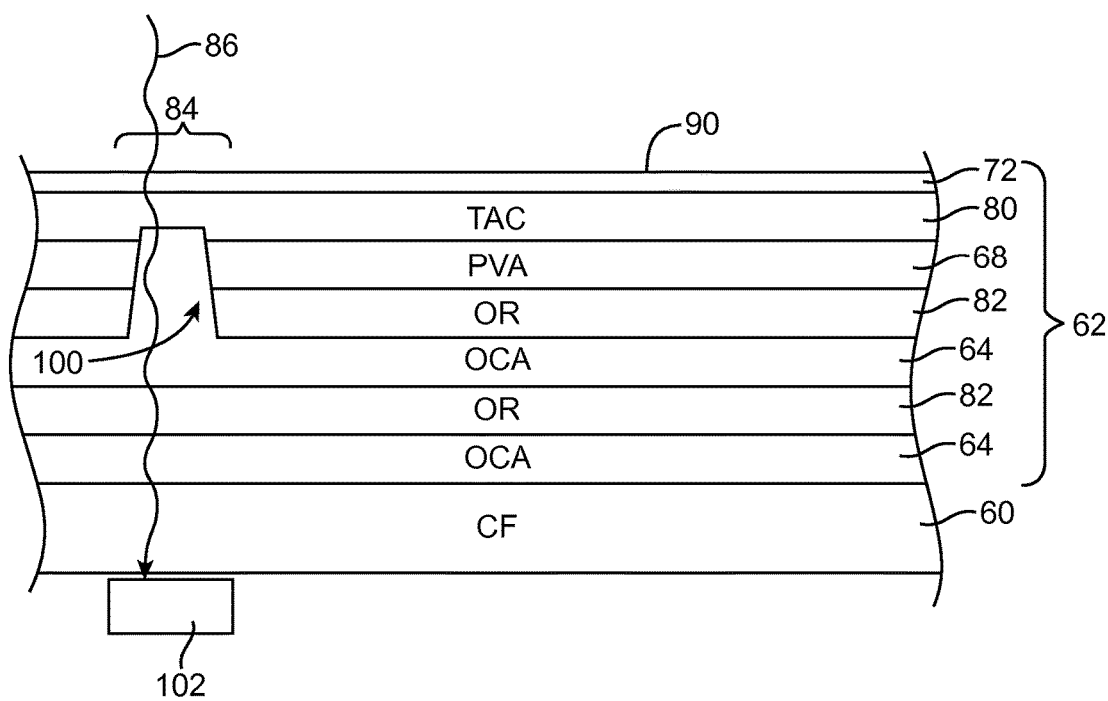
FIG. 8 is a cross-sectional side view of a portion of a display having an upper polarizer with an unpolarized window formed from an opening in a polyvinyl alcohol layer and an optical retarder layer in accordance with an embodiment of the present invention.

FIG. 8 is a cross-sectional side view of a portion of a polarizer such as polarizer 62 having a continuous outer surface 90 and an unpolarized window 84 that allows light 86 to reach structure 102 through window 84. In the example of FIG. 8, unpolarized window 84 is formed from an opening 100 in PVA layer 68 and adjacent optical retarder layer 82. As shown in FIG. 8, opening 100 may, if desired, extend partially into TAC layer 80. However, whether or not opening 100 extends partially into TAC layer 80, TAC layer 80 may include at least a portion that passes continuously over opening 100 in PVA layer 68 so that outer surface 90 of polarizer 62 is a continuous outer surface.

Coating materials 72 may be formed over the continuous surface of tri-acetyl cellulose layer 80. Opening 100 in PVA layer 68 and optical retarder layer 82 may be filled with a transparent material such as a portion of optically clear adhesive layer 64. Because PVA layer 68 is the layer of polarizer 62 that polarizes light, opening 100 in PVA layer 68 prevents light 86 that passes through window 84 from being affected by the polarizing effects of polarizer 62.

Figure 9:
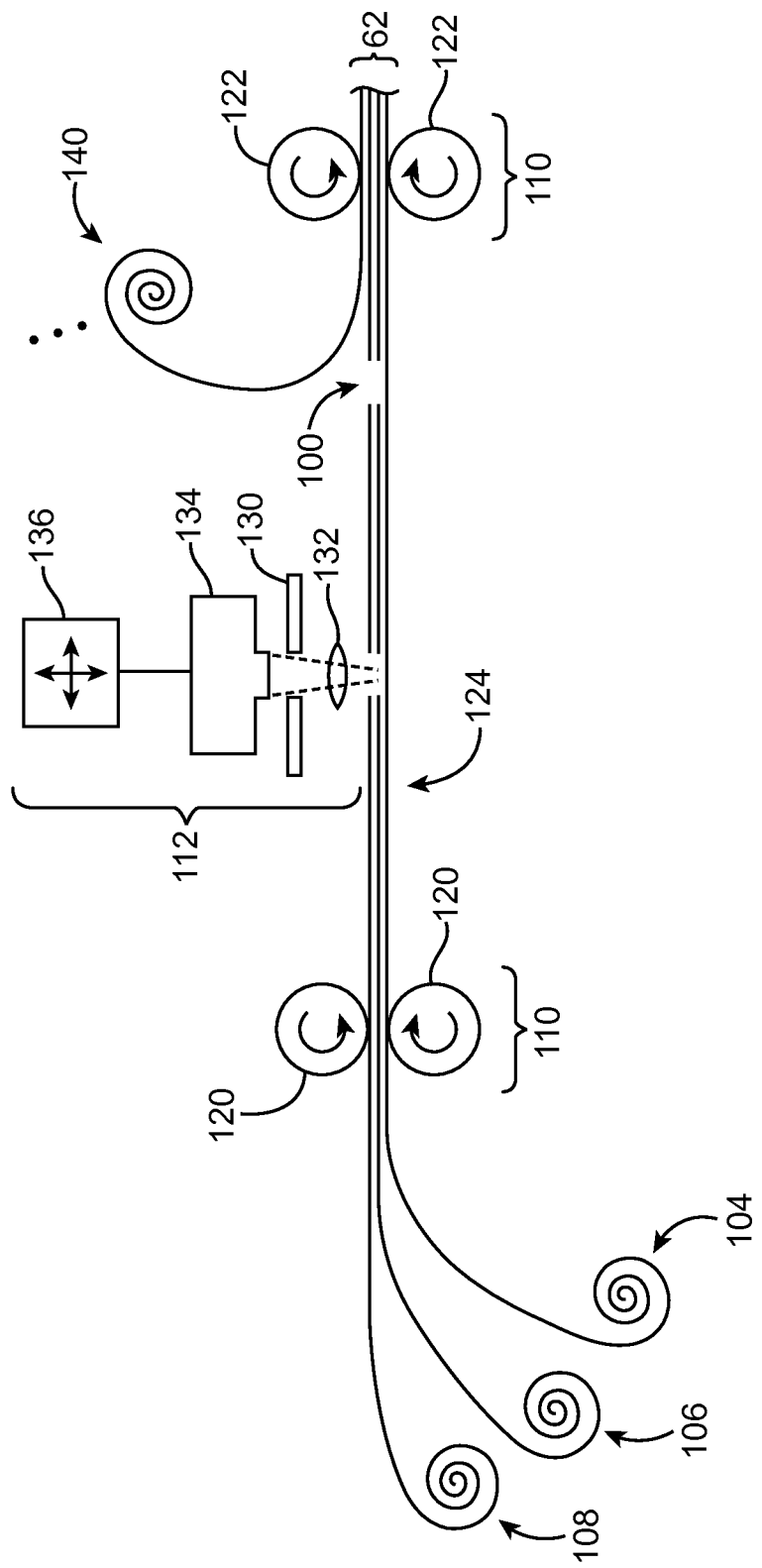
FIG. 9 is a diagram of an illustrative system for forming an upper polarizer with an unpolarized window formed from an opening in a polyvinyl alcohol layer and an optical retarder layer in accordance with an embodiment of the present invention.

Opening 100 may be formed in PVA layer 68 and optical retarder layer 82 using a system of the type shown in FIG. 9. The system of FIG. 9 may use roll-to-roll and sheet-tosheet lamination processes to form polarizer 62. As shown in FIG. 9, a carrier substrate may be provided in the form of a roll of material such as carrier layer roll 104. PVA layer 68 and tri-acetyl cellulose layer 80 may be provided in a roll of PVA sheet material that is laminated to tri-acetyl cellulose sheet material such PVA/TAC roll 106. Optical retarder layer 82 may be dispensed from a roll of optical retarder sheet material such as roll 108.

In a continuous process, rolls 104, 106, and 108 may dispense a carrier layer, a laminated TAC/PCA layer, and an optical retarder layer. The layers may be compressed (laminated) together using lamination equipment 110 such as rollers 120 or other roll-to-roll lamination equipment to form a sheet of materials such as sheet 124. The roll-to-roll lamination process may then continue by passing sheet 124 under drilling equipment 112.

Drilling equipment 112 may then be used to drill openings 100 in sheet 124 (e.g., openings in the PVA layer and the optical retarder layer that do not pass through the TAC layer). Drilling equipment 112 may include a laser such as laser 134 that emits a laser beam such as an infrared laser beam, an ultraviolet laser beam, or an optical laser beam. Laser 134 may be a continuous wave laser or a pulsed laser. The position of laser 134 may be controlled using computer-controlled positioner 136. Drilling equipment 112 may include additional optical components such as aperture 130 and lens 132 that help focus the laser beam from laser 134 for laser drilling of sheet 124.

After forming openings 100 in sheet 124, remaining polarizer layers of polarizer 62 may be laminated to sheet 124 using additional laminating equipment 110 such as rollers 122. For example, a sheet of optically clear adhesive may be dispensed from roll 140 and laminated to the optical retarder sheet from roll 108. The adhesive sheet may include portions that fill openings 100 in sheet 124. However, this is merely illustrative. If desired, optically clear adhesive material may be deposited onto the optical retarder sheet and into openings 100 from a dispenser. An additional layer of optical retarder material may be then be dispensed from roll 140 and laminated onto the optical retarder sheet that came from roll 108 using the deposited adhesive. If desired, additional materials may be laminated to sheet 124 to form polarizer 62. Laminating equipment 110 may include other equipment such as ovens, dispensers, computing equipment or other equipment. Drilling equipment 112 may include other equipment such as mechanical drills, monitoring equipment, computing equipment or other equipment.

If desired, the roll-to-roll lamination operations may be performed in one or more individual steps, rather than continuously as shown in FIG. 9. For example, following a first roll-to-roll lamination operation to produce material 124, material 124 may be collected onto a roll at one manufacturing facility. Later, at the same facility or at another manufacturing facility, that roll of material 124 may be cut, drilled and laminated with additional polarizer layers (e.g., optical retarder layers or other optical films) to form polarizer 62 in a subsequent lamination operation.

Figure 10:
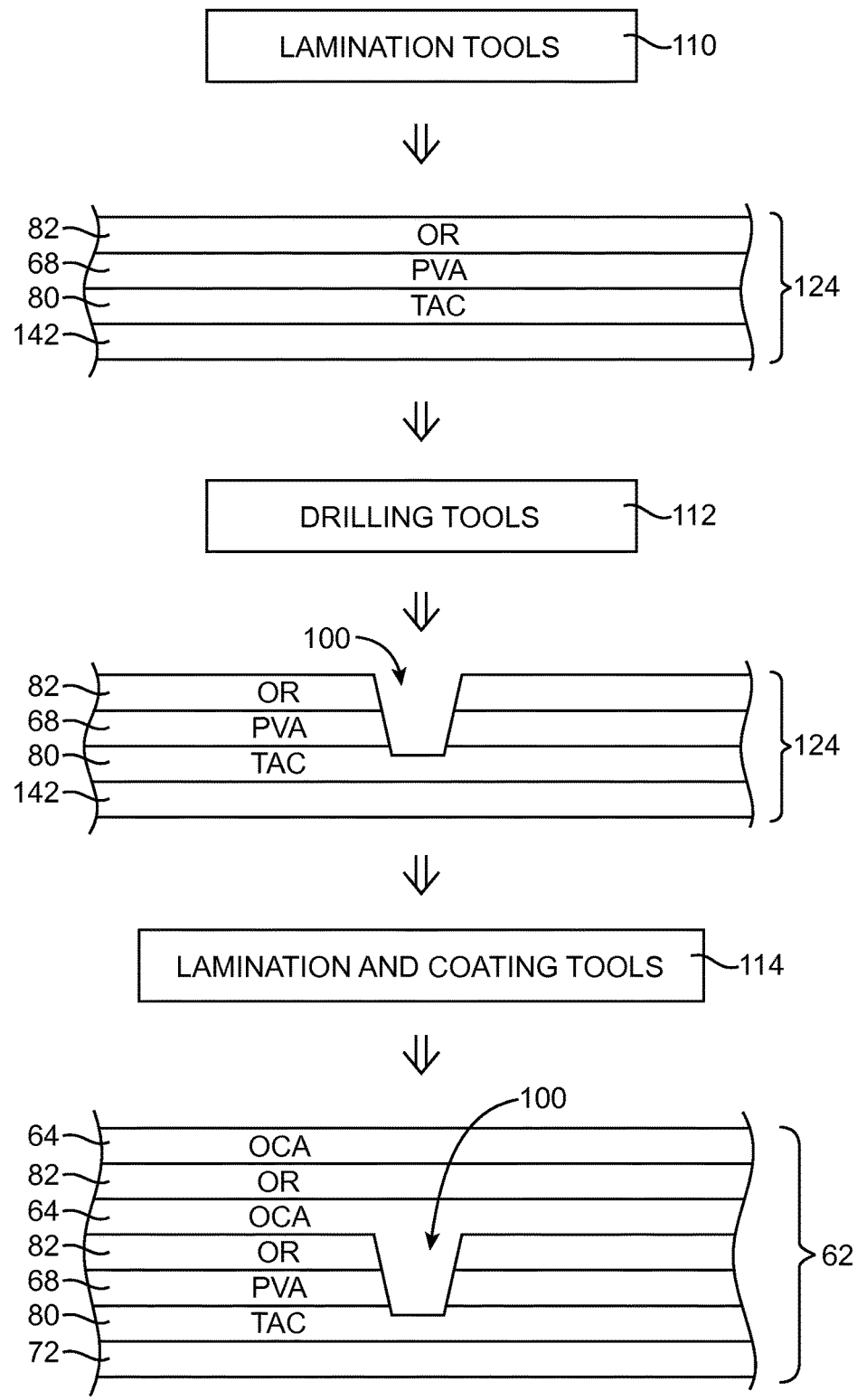
FIG. 10 is a diagram showing how openings may be formed in polarizer layers during lamination operations for the polarizer in accordance with an embodiment of the present invention.

FIG. 10 is a diagram showing how opening 100 may be formed in PVA layer 68 and optical retarder layer 82 during lamination operations. As shown in FIG. 10, lamination tools 110 may be used to form a laminated sheet such as sheet 124 having a carrier layer 142, TAC layer 80, PVA layer 68, and optical retarder 82. Drilling tool 112 may be used to form an opening such as opening 100 in sheet 124. Opening 100 may be an opening in PVA layer 68, optical retarder layer 82 and, if desired, a portion of TAC layer 80.

Lamination and coating tools 114 (e.g., laminating tools 110 and additional tools for providing coatings such as anti-reflective coatings, anti-glare coatings, oleophobic coatings, etc.) may be used to provide transparent material such as optically clear adhesive material in opening 100, to form additional polarizer layers such additional optically clear adhesive layers 64 and additional optical retarder layers 82 on sheet 124, and to form coating 72 on tri-acetyl cellulose layer 80. Lamination and coating tools 114 may also be used to remove carrier layer 142 from tri-acetyl cellulose layer 80 prior to providing coating 72 on TAC layer 80.

Figure 11:
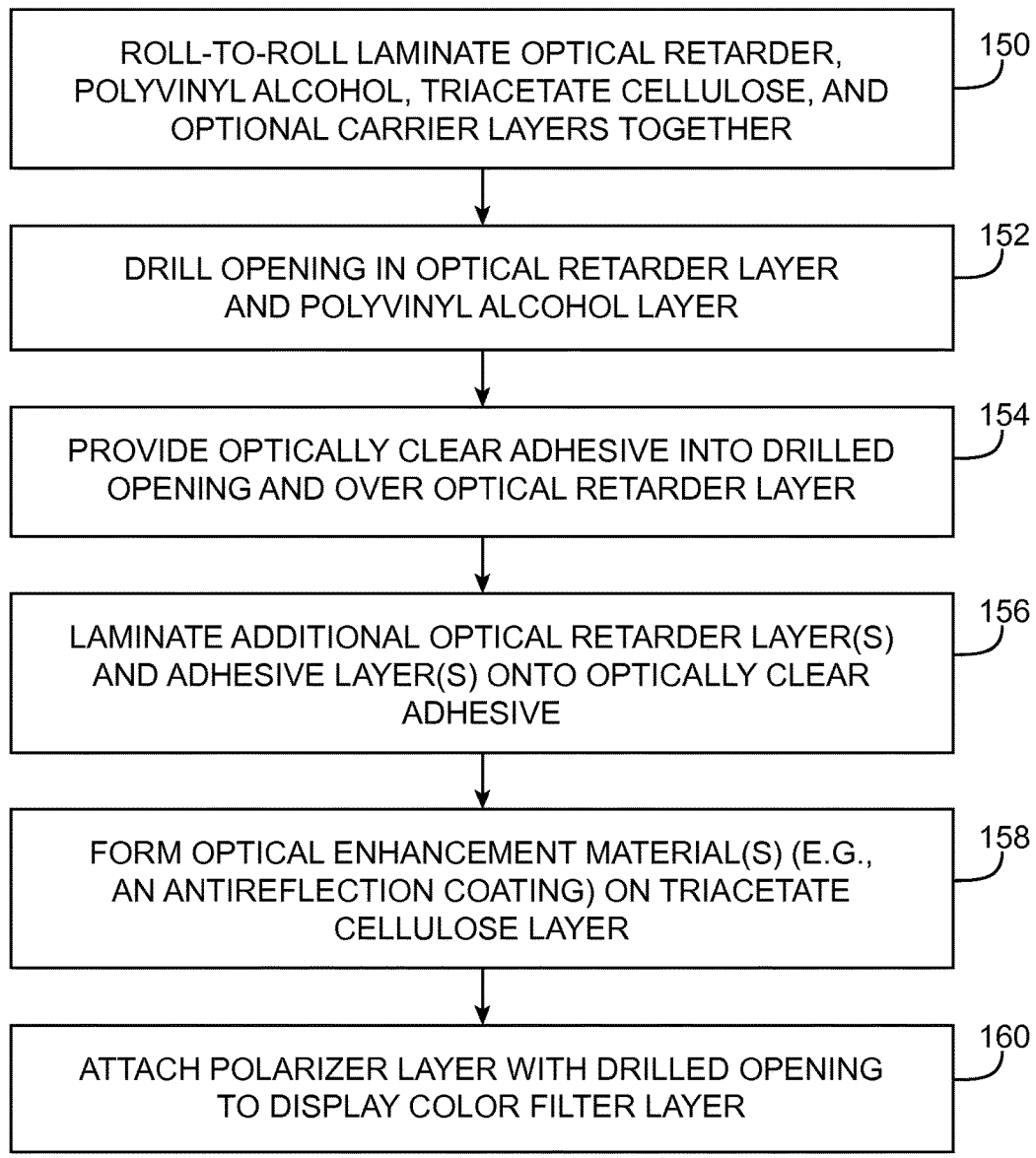
FIG. 11 is a flow chart of illustrative steps that may be used in forming openings in polarizer layers during lamination operations for the polarizer in accordance with an embodiment of the present invention.

Illustrative steps involved in forming a polarizer such as polarizer 62 having an unpolarized window such as window 84 formed from an opening in a PVA layer and an optical retarder layer are shown in FIG. 11.

At step 150, an optical retarder layer, a polyvinyl alcohol layer, and a tri-acetyl cellulose (triacetate cellulose) layer may be attached (e.g., laminated) to a carrier layer.

At step 152, an opening may be drilled in the optical retarder layer and the polyvinyl alcohol layer. If desired, the opening may extend partially into the tri-acetyl cellulose layer.

At step 154, transparent material such as optically clear adhesive material may be provided in the drilled opening and over the optical retarder layer.

At step 156, one or more additional optical retarder layers and one or more additional adhesive layers may be laminated onto the provided optically clear adhesive.

At step 158, optical enhancement materials such as an antireflection coating or other coating materials may be formed on the tri-acetyl cellulose layer.

At step 160, the polarizer layer with the drilled opening that is filled with the transparent material may be attached to additional display structures such as a display color filter glass layer.

The example described in FIGS. 8-11 in which unpolarized window 84 is formed from an opening in PVA layer 68 and optical retarder layer 82 without passing through other polarizer layers is merely illustrative. Polarizer 62 may be formed with a continuous outer surface and an unpolarized window using other configurations such as those described below in connection with FIGS. 12-17.

Figure 12:
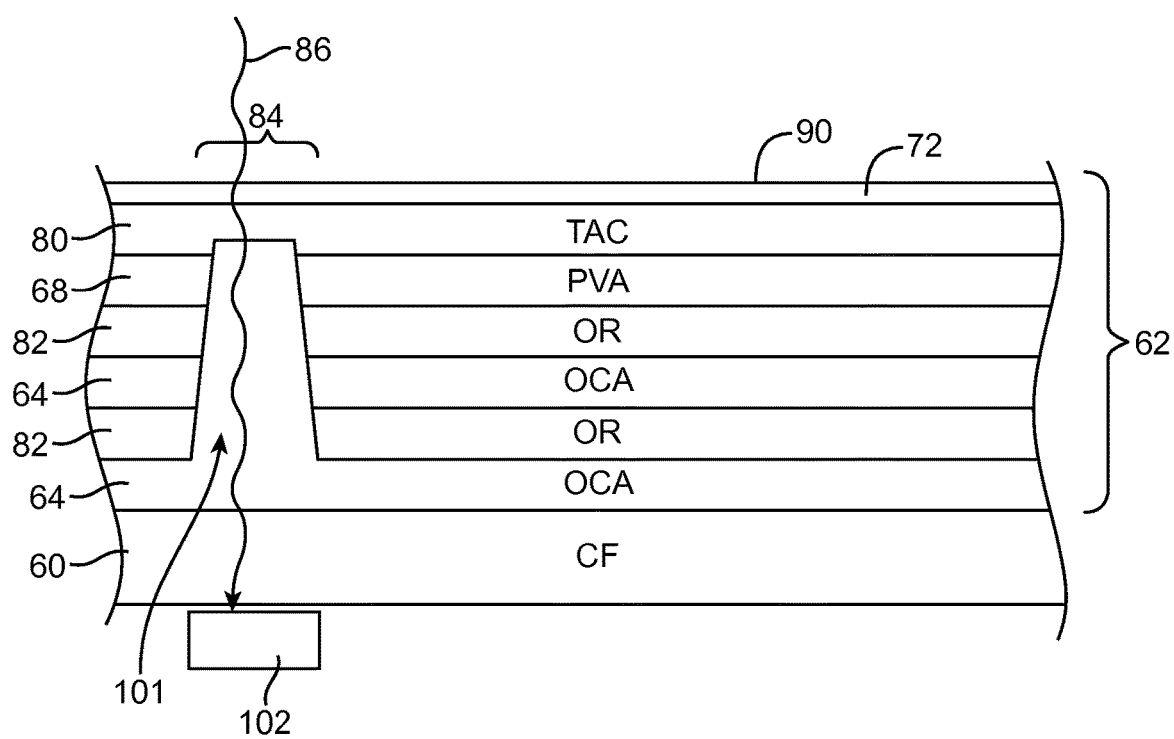
FIG. 12 is a cross-sectional side view of a portion of a display having an upper polarizer with an unpolarized window formed from an opening in a polyvinyl alcohol layer and multiple optical retarder layers in accordance with an embodiment of the present invention.

As shown in FIG. 12, polarizer 62 may have a continuous outer surface 90 and an unpolarized window 84 formed from an opening 101 in PVA layer 68, multiple optical retarder layers 82 and multiple adhesive layers 64. Opening 101 may also, if desired, extend partially into tri-acetyl cellulose layer 80. However, TAC layer 80 may pass continuously over opening 101 in PVA layer 68, retarder layers 82 and adhesive layers 64 so that outer surface 90 of polarizer 62 is a continuous outer surface. Coating materials 72 may be formed over the continuous surface of tri-acetyl cellulose layer 80. Opening 101 in PVA layer 68, retarder layers 82 and adhesive layers 64 may be filled with a transparent material such as a portion of optically an outermost optically clear adhesive layer 64.

The optically clear adhesive layer 64 that extends into opening 101 and fills opening 101 may be used to attach polarizer layer 62 to color filter layer 60.

Figure 13:
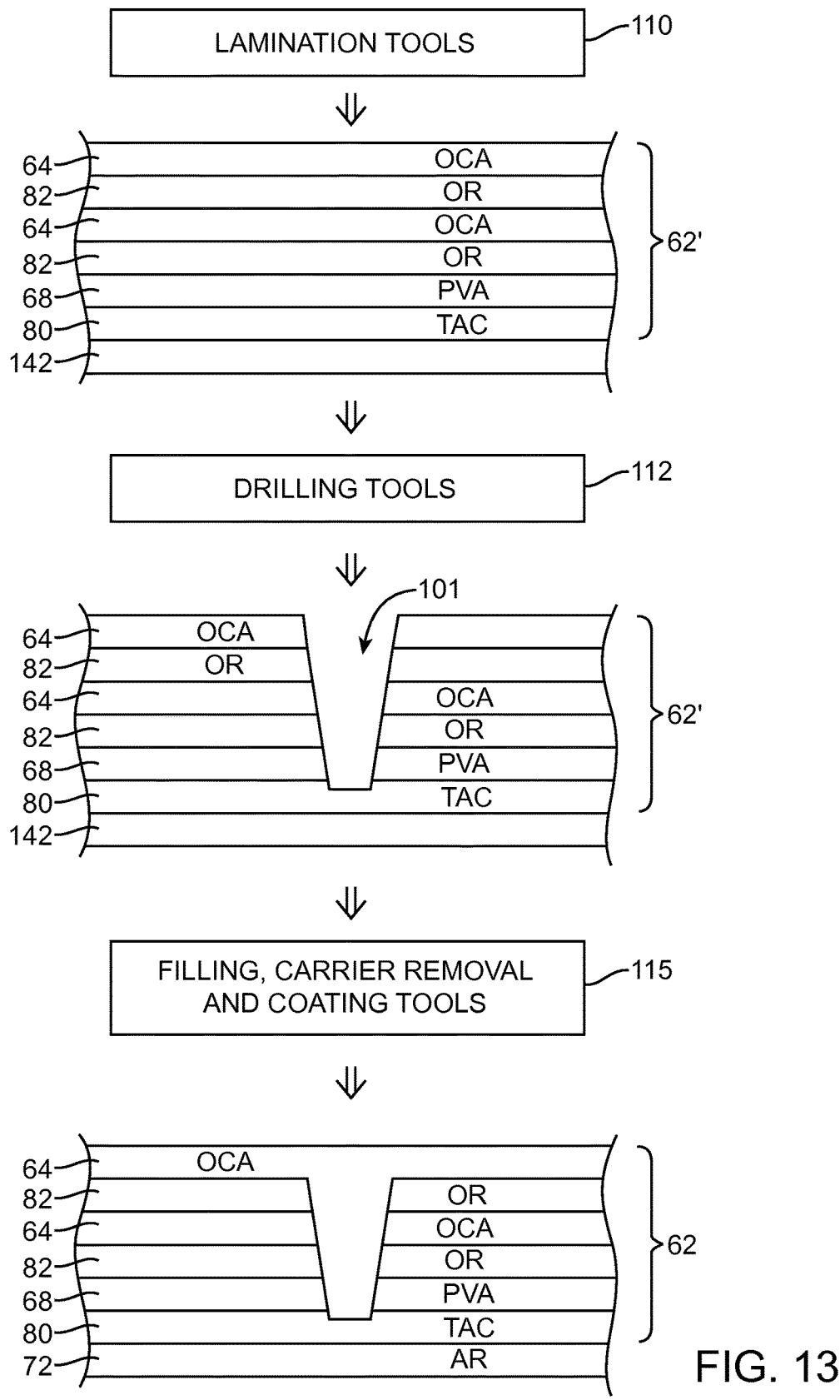
FIG. 13 is a diagram showing how openings may be formed in polarizer layers following lamination operations for the polarizer in accordance with an embodiment of the present invention.

FIG. 13 is a diagram showing how opening 101 may be formed in PVA layer 68, retarder layers 82 and adhesive layers 64 following lamination operations for polarizer 62. As shown in FIG. 13, lamination tools 110 may be used to form polarizer 62' without any unpolarized windows and to attach polarizer 62' to carrier layer 142. Drilling tools 112 may then be used to form an opening such as opening 101 in polarizer 62' that passes through PVA layer 68, retarder layers 82, adhesive layers 64, and, if desired, a portion of TAC layer 80.

Filling, carrier removal, and coating tools 115 (e.g., adhesive dispenser, coating dispensers, and additional tools) may be used to provide additional transparent material such as additional optically clear adhesive material in opening 101, to remove carrier 142 from TAC layer 80, and to form coating 72 on TAC layer 80.

Figure 14:
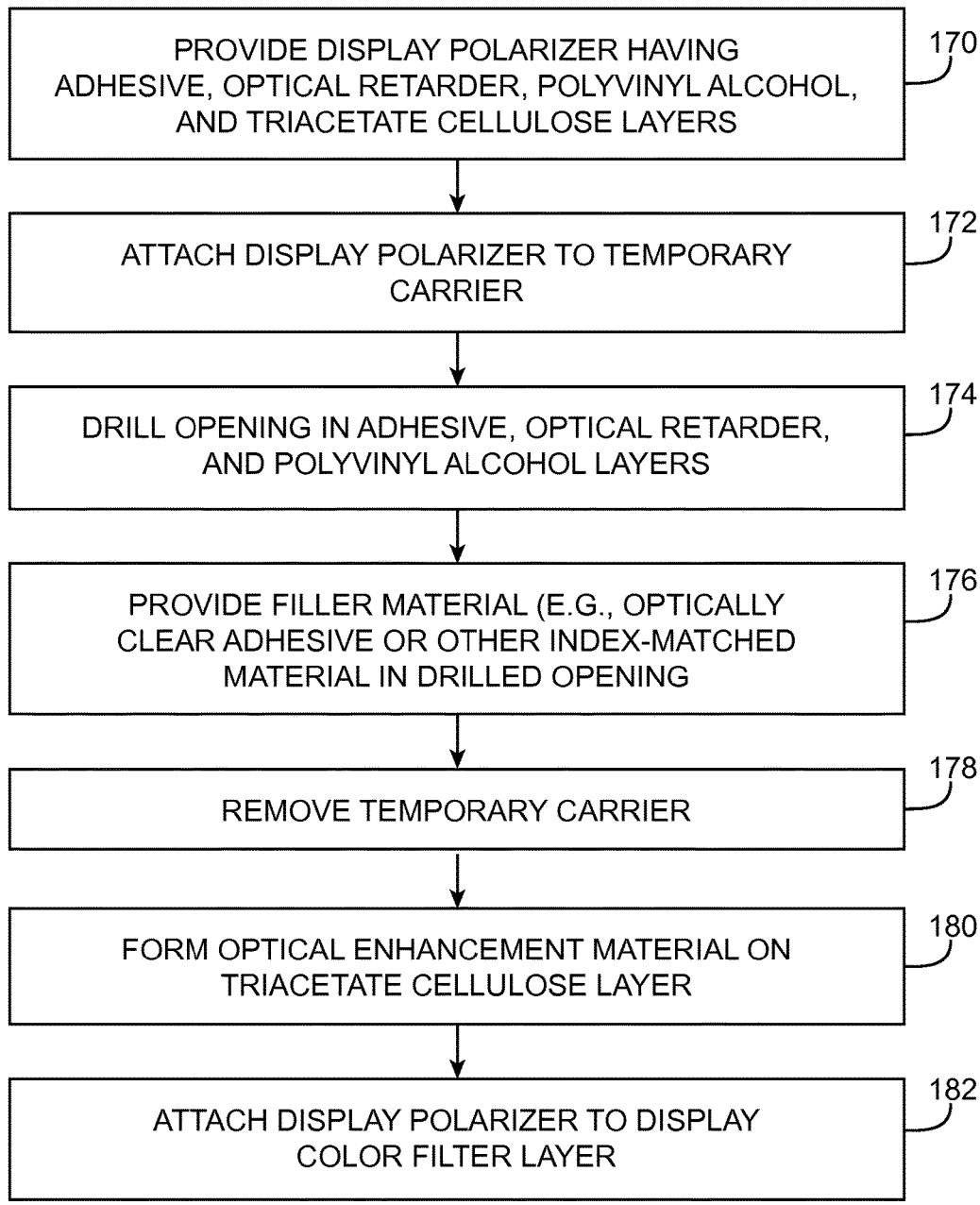
FIG. 14 is a flow chart of illustrative steps that may be used in forming openings in polarizer layers following lamination operations for the polarizer in accordance with an embodiment of the present invention.

Illustrative steps involved in forming a polarizer such as polarizer 62 having an unpolarized window such as window 84 formed from an opening in a PVA layer, multiple optical retarder layers and multiple adhesive layers are shown in FIG. 14.

At step 170, a display polarizer may be provided that includes adhesive layers, optical retarder layers, a polyvinyl alcohol layer, and a tri-acetyl cellulose layer.

At step 172 the display polarizer may be attached to a temporary carrier layer.

At step 174, an opening may be drilled in the display polarizer that passes through the adhesive layers, the optical retarder layers and the polyvinyl alcohol layer. If desired, the opening may extend partially into the tri-acetyl cellulose layer. The opening may be drilled using laser drilling equipment (as an example).

At step 176, transparent filler material such as optically clear adhesive material may be provided in the drilled opening.

At step 178, the temporary carrier layer may be removed.

At step 180, optical enhancement materials such as an antireflection coating or other coating materials may be formed on the tri-acetyl cellulose layer.

At step 182, the polarizer layer with the drilled opening that is filled with the transparent material may be attached to additional display structures such as a display color filter glass layer.

Figure 15:
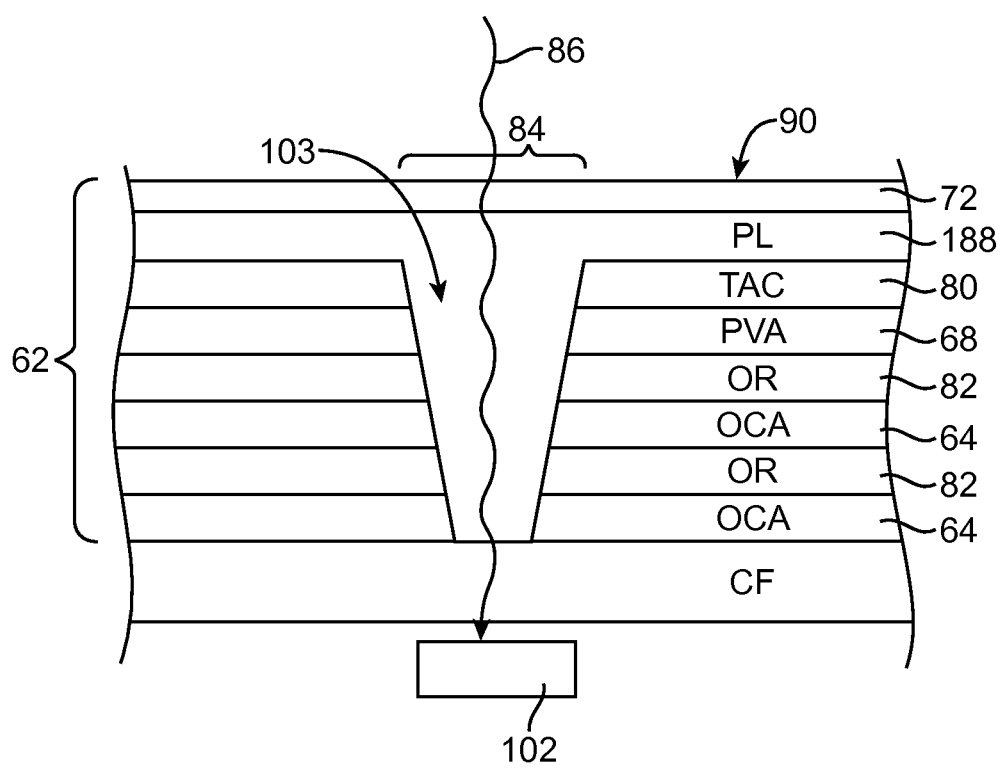
FIG. 15 is a cross-sectional side view of a portion of a display having an upper polarizer with an unpolarized window formed from a through-hole in the upper polarizer that is filled with a transparent material in accordance with an embodiment of the present invention.

As shown in FIG. 15, polarizer 62 may have a continuous outer surface 90 that is formed from a protective layer such as protective layer (PL) 188 (and associated films 72) and an unpolarized window 84 formed from an opening 103 in PVA layer 68, multiple optical retarder layers 82, multiple adhesive layers 64, and TAC layer 80.

Protective layer 188 may be formed from transparent materials such as transparent polymers or glass. Protective layer 188 may include a portion that covers TAC layer 80 and a portion that fills opening 103. In this way, unpolarized window 84 may be formed from an opening (e.g., a through-hole) that passes through substantially all of the polarizer layers of polarizer 62 while maintaining a smooth, continuous outer surface for polarizer 62.

Materials 72 may be formed over the continuous surface protective layer 188.

Figure 16:
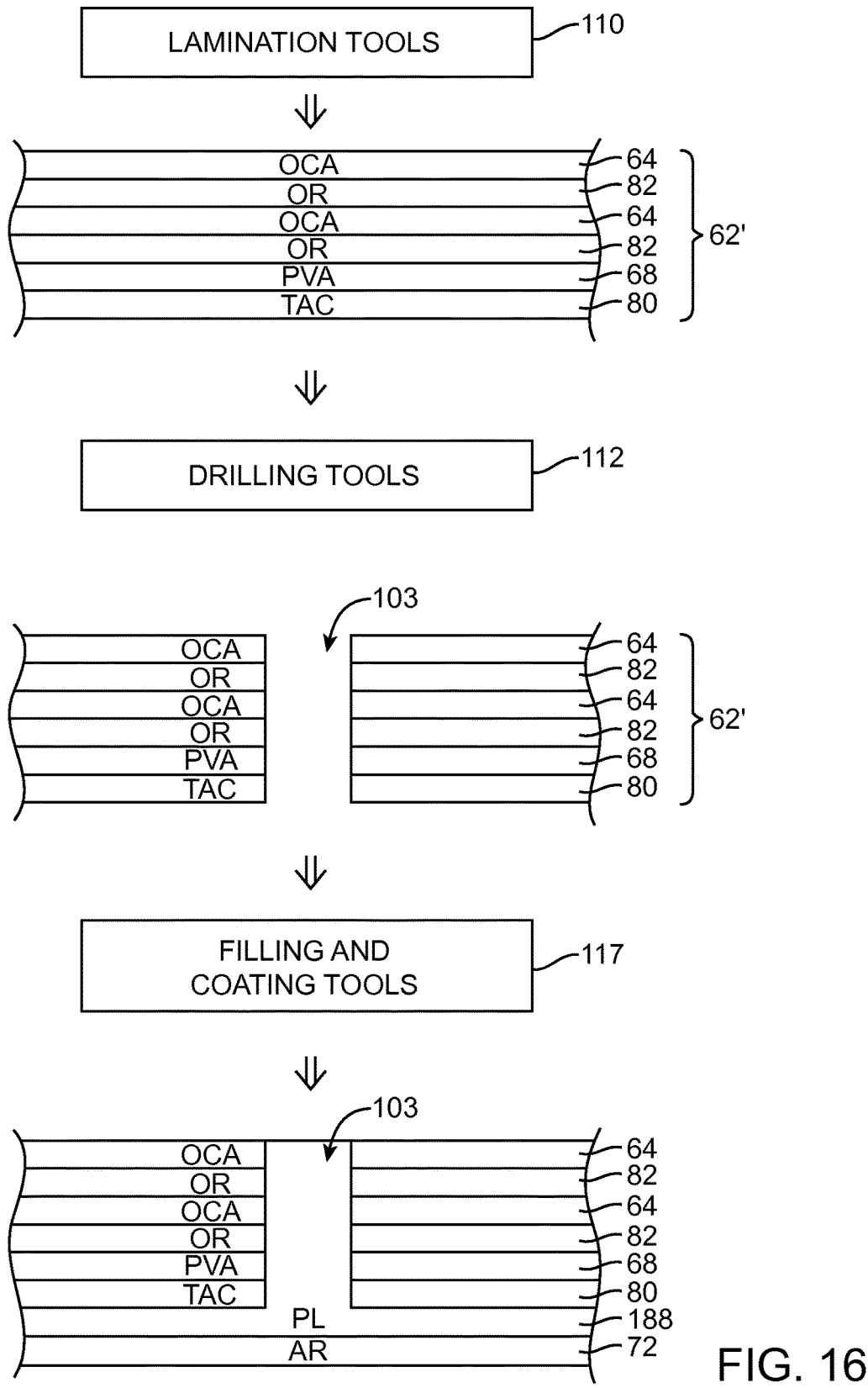
FIG. 16 is a diagram showing how through-holes may be formed in a polarizer and how the through-holes may be filled with transparent materials following lamination operations for the polarizer in accordance with an embodiment of the present invention.

FIG. 16 is a diagram showing how through-hole 103 may be formed in PVA layer 68, retarder layers 82, adhesive layers 64, and tri-acetyl cellulose layer 80 following lamination operations for polarizer 62. As shown in FIG. 16, lamination tools 110 may be used to form polarizer 62' without any unpolarized windows. Drilling tools 112 may then be used to form an opening such as through-hole 103 in polarizer 62' that passes through PVA layer 68, retarder layers 82, adhesive layers 64, and tri-acetyl cellulose layer 80.

Filling and coating tools 117 (e.g., adhesive dispenser, coating dispensers, polymer dispensers, liquid glass dispensers, and/or additional tools) may be used to provide additional transparent material such as polymer or glass material for protective layer 188 in opening 103 and over TAC layer 80.

Figure 17:
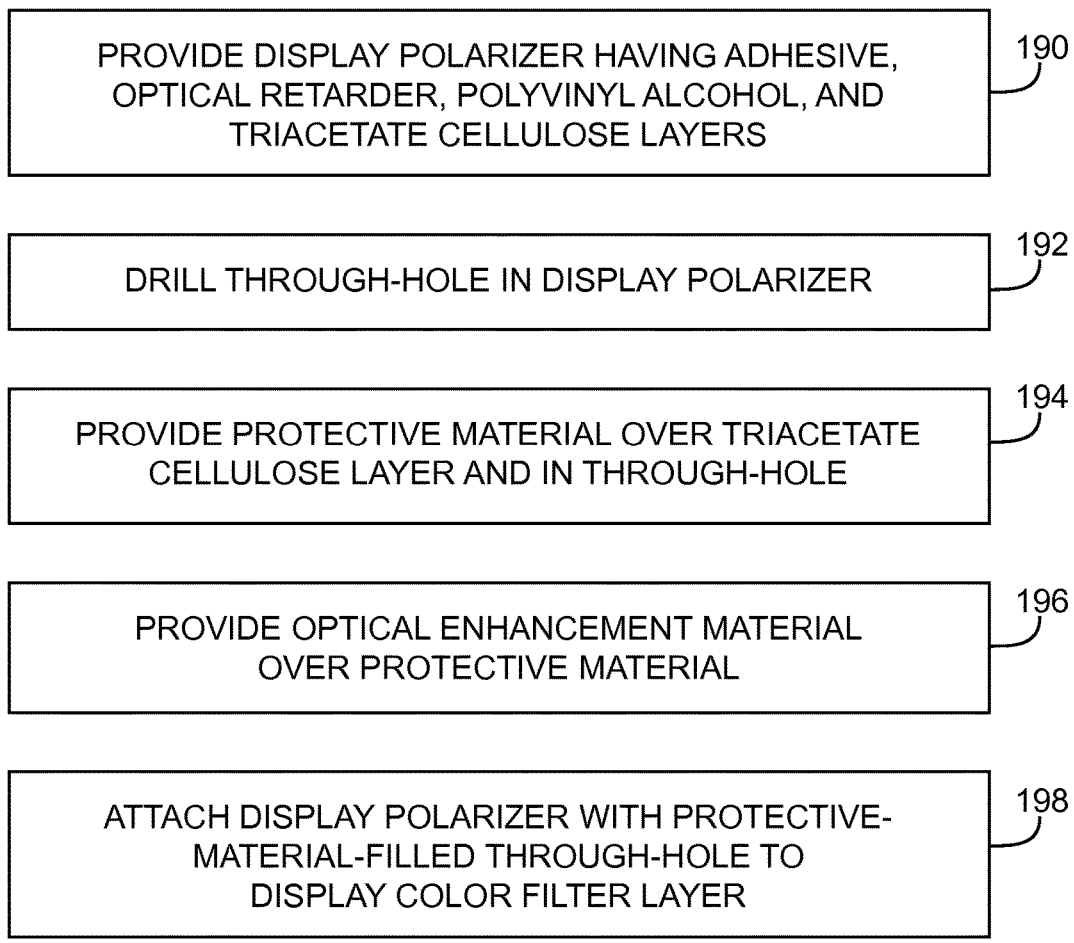
FIG. 17 is a flow chart of illustrative steps that may be used in forming a polarizer with an unpolarized window formed from a through-hole in the upper polarizer that is filled with a transparent material in accordance with an embodiment of the present invention.

Illustrative steps involved in forming a polarizer such as polarizer 62 having an unpolarized window such as window 84 formed from a through-hole in a PVA layer, multiple optical retarder layers, multiple adhesive layers, and a TAC layer are shown in FIG. 17.

At step 190, a display polarizer may be provided that includes adhesive layers, optical retarder layers, a polyvinyl alcohol layer, and a tri-acetyl cellulose (triacetate cellulose) layer.

At step 192, an opening such as a through-hole may be drilled in the display polarizer that passes through the display polarizer (e.g., through the adhesive layers, the optical retarder layers, the polyvinyl alcohol layer, and the tri-acetyl cellulose layer). The through-hole may be drilled using, for example, laser drilling equipment.

At step 194, transparent filler material such as protective polymer or glass material may be provided in the through-hole and over the tri-acetyl cellulose layer.

At step 196, optical enhancement materials such as an antireflection coating or other coating materials may be formed on the protective material.

At step 198, the display polarizer with the protective-material-filled drilled opening that is filled with the transparent material may be attached to additional display structures such as a display color filter glass layer.

Figure 18:
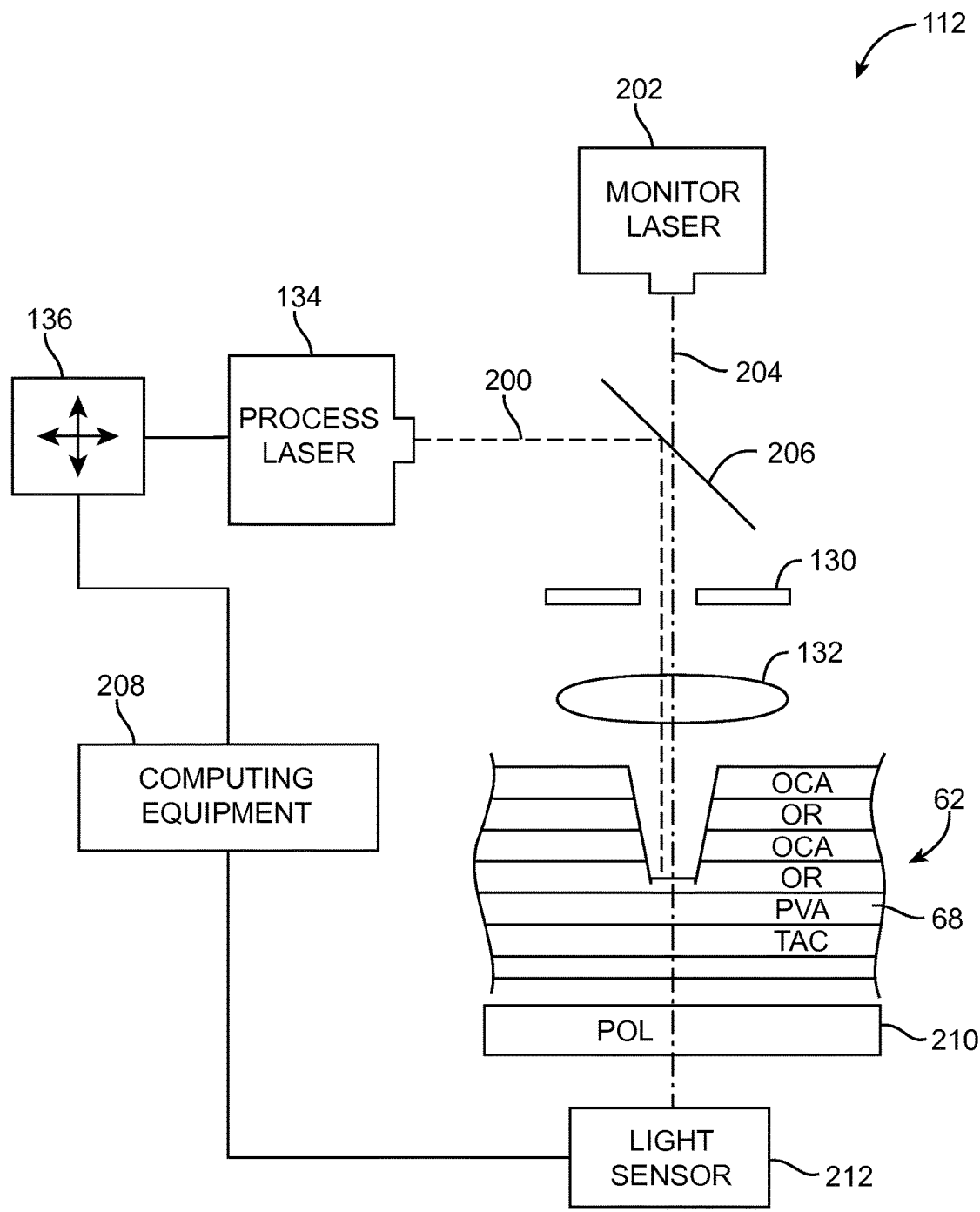
FIG. 18 is a diagram of a laser drilling system with an optical feedback loop showing how the system may be used in drilling openings in polarizer layers of a polarizer for an unpolarized window in the polarizer in accordance with an embodiment of the present invention.

FIG. 18 is a diagram of drilling equipment 112 that may be used for drilling openings that pass partially or completely through display polarizer layers. As shown in FIG. 18, drilling equipment 112 may include (in addition to laser 134, computer controlled positioning equipment 136, aperture 130, and lens 132 as described above in connection with FIG. 9), computing equipment 208, a monitor laser 202, polarizer block 210, and light sensor 212.

Process laser 134 may emit a high frequency laser beam 200 that reflects from mirror 206 onto polarizer 62 and removes material from polarizer layers of polarizer 62 during drilling operations. Computing equipment 208 may be used to control process laser 134, equipment 136, monitor laser 202 and light sensor 212. Monitor laser 202 may emit a laser beam such as optical laser beam 204 (e.g., a green-colored laser beam) that passes through polarizer 62. Mirror 206 may be a beam splitting mirror that allows optical beam 204 to pass through mirror 206 onto polarizer 62. Optical beam 204 may pass through polarizer block 210 and onto sensor 212. Polarizer block 210 may be a polarizer that is oriented in a direction that is orthogonal to the orientation of polarization of PVA layer 68. Computing equipment 208 may monitor the intensity of the portion of beam 204 that reaches sensor 212 during drilling operations for polarizer 62. The amount of light from beam 204 that reaches sensor 212 will increase as PVA layer 68 is removed using process beam 200.

Computing equipment 208 may determine when drilling operations are complete using the monitored intensity of the beam 204. For example, computing equipment 208 may be configured to terminate drilling operations when the intensity of beam 204 reaches a predetermined threshold level (e.g., a threshold level determined using monitored light intensities from drilling operations for other polarizers or using predetermined measurements of the unattenuated intensity of beam 204) or when the change in intensity of beam 204 falls to or below a predetermined minimum rate of change.

Drilling equipment 112 of the type shown in FIG. 18 may be used in forming any of openings 100, 101, 103 (see, e.g., FIGS. 8, 12, and 15) or other openings for unpolarized windows in polarizers such as polarizer 62 of display 14 of device 10.

The foregoing is merely illustrative of the principles of this invention and various modifications can be made by those skilled in the art without departing from the scope and spirit of the invention.

What is claimed is:

1. An electronic device display comprising:
   a polarizer comprising a plurality of polarizer layers, wherein a first polarizer layer in the plurality of polarizer layers includes an opening, and wherein a second polarizer layer in the plurality of polarizer layers overlaps the opening.

2. The electronic device display defined in claim 1, wherein the first polarizer layer comprises a layer of polyvinyl alcohol.

3. The electronic device display defined in claim 2, wherein the second polarizer layer comprises a layer of optically clear adhesive.

4. The electronic device display defined in claim 3, wherein the layer of optically clear adhesive at least partially fills the opening in the layer of polyvinyl alcohol.

5. The electronic device display defined in claim 4 further comprising a third polarizer layer and an opening in the third polarizer layer that overlaps the opening in the first polarizer layer.

6. The electronic device display defined in claim 5, wherein the third polarizer layer comprises an optical retarder layer.

7. The electronic device display defined in claim 6, wherein the layer of optically clear adhesive at least partially fills the opening in the layer of polyvinyl alcohol and the opening in the optical retarder layer.

8. The electronic device display defined in claim 7, wherein the optical retarder layer is interposed between the layer of polyvinyl alcohol and the layer of optically clear adhesive.

9. A display comprising:
   a display substrate; and
   a polarizer attached to the display substrate, wherein the polarizer comprises:
      an opening that extends partially through the polarizer; and
      transparent material in the opening.

10. The display defined in claim 9, wherein the polarizer comprises a layer of polyvinyl alcohol and an optical retarder layer interposed between the display substrate and the layer of polyvinyl alcohol, and wherein the opening extends through the layer of polyvinyl alcohol and the optical retarder layer.

11. The display defined in claim 10, wherein the transparent material comprises a layer of optically clear adhesive that attaches the polarizer to the display substrate.

12. The display defined in claim 11, wherein the polarizer further comprises a layer of tri-acetyl cellulose that overlaps the opening.

13. The display defined in claim 12, wherein the opening extends into the layer of tri-acetyl cellulose.

14. The display defined in claim 12, wherein the layer of polyvinyl alcohol is interposed between the layer of tri-acetyl cellulose and the optical retarder layer.

15. The display defined in claim 10, wherein the transparent material comprises a protective layer that forms an outer surface of the polarizer.

16. The display defined in claim 15, wherein the protective layer extends from the outer surface of the polarizer to the display substrate to fill the opening.

17. An electronic device comprising:
   a display having an active region and an inactive region; and
   a polarizer in the display that overlaps the active region and the inactive region, wherein the polarizer comprises a plurality of layers, wherein a first layer of the plurality of layers comprises an opening in the inactive region, and wherein a second layer of the plurality of layers overlaps the opening and forms an outer surface of the display.

18. The electronic device defined in claim 17 further comprising a camera that receives unpolarized light through the opening.

19. The electronic device defined in claim 17 wherein the second layer comprises a protective layer that extends continuously over the plurality of layers to form a continuous outer surface of the polarizer.

20. The electronic device defined in claim 19 wherein the protective layer at least partially fills the opening.

* * * * *